United States Patent [19]

Chung et al.

[11] Patent Number: 5,281,316

[45] Date of Patent: Jan. 25, 1994

[54] CATHODIC ELECTRODEPOSITION COATINGS HAVING IMPROVED THROWING POWER

[75] Inventors: Ding Y. Chung, Rochester Hills; Robert J. Sikora, Detroit; John J. Vincent, Sterling Heights, all of Mich.

[73] Assignee: E. I. Du Pont de Nemours and Company, Wilmington, Del.

[21] Appl. No.: 890,894

[22] Filed: May 29, 1992

[51] Int. Cl.⁵ .............................. C25D 13/10
[52] U.S. Cl. ....................... 204/181.7; 204/181.4; 523/415; 524/901
[58] Field of Search ............... 204/181.7, 181.4; 523/415; 524/901

[56] References Cited

U.S. PATENT DOCUMENTS

| | | | |
|---|---|---|---|
| 3,922,253 | 11/1975 | Jerabek et al. | 260/77.5 TB |
| 4,134,866 | 1/1979 | Tominaga et al. | 204/181.7 |
| 4,137,140 | 1/1979 | Belanger | 204/181 C |
| 4,182,833 | 1/1980 | Hicks | 204/181.7 |
| 4,419,467 | 12/1983 | Wismer et al. | 523/414 |
| 4,433,078 | 2/1984 | Kerster et al. | 204/181.7 |
| 4,443,569 | 4/1984 | Schroder et al. | 204/181.7 |
| 4,468,307 | 8/1984 | Wismer et al. | 204/181 C |
| 4,612,338 | 9/1986 | Chung et al. | 204/181.7 |
| 4,649,170 | 3/1987 | Reid | 106/14.15 |
| 4,904,361 | 2/1990 | Motohashi et al. | 204/181.7 |
| 5,011,733 | 4/1991 | Hircki et al. | 204/181.7 |
| 5,106,415 | 4/1992 | Davidian | 106/14.26 |
| 5,187,198 | 2/1993 | Nishida et al. | 204/181.7 |

Primary Examiner—John Niebling
Assistant Examiner—Kishor Mayekar
Attorney, Agent, or Firm—Hilmar L. Fricke

[57] ABSTRACT

An improved aqueous electrocoating composition having a binder of an epoxy-amine adduct and a blocked polyisocyanate crosslinking agent; wherein the improvement is the use of an effective amount of a blend of a zinc containing compound and a lead pigment to form an electrocoating composition that has significantly improved throwing power and provides a coating that has the necessary properties such as chip, solvent and corrosion resistance.

8 Claims, No Drawings

CATHODIC ELECTRODEPOSITION COATINGS HAVING IMPROVED THROWING POWER

BACKGROUND OF THE INVENTION

This invention is directed to a cathodic electrocoating composition that has improved throwing power.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in a bath of a coating composition containing an aqueous emulsion of film forming polymer and acts as an electrode in the electrodeposition process. An electric current is passed between the article and a counter-electrode in electrical contact with the aqueous emulsion until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from a polyepoxide which has been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at a sufficient temperature to produce a crosslinked finish on the article.

Cathodic electrocoating compositions and resin compositions, coating baths, and cathodic electrodeposition processes are disclosed in Jerabek et al U.S. Pat. Nos. 3,922,253 issued Nov. 25, 1975; Wismer et al 4,419,467 issued Dec. 6, 1983; Belanger 4,137,140 issued Jan. 30, 1979 and Wismer et al 4,468,307 issued Aug. 25, 1984.

Throwing power of electrocoating compositions continues to be a problem. Throwing power is the degree to which an electrodeposited film penetrates and coats the surfaces of recessed interior areas of an automobile or truck body. Electrodeposition of coatings follows the force lines of the electrical field that exists between the cathode and anode. These force lines diminish as they penetrate into recessed areas and cease to exist when the recessed area is too deep and a coating will not be deposited into such areas.

As automobile and truck body designs change, there is an increased need for electrocoating compositions with increased throwing power that will penetrate into recessed areas. The improved composition of this invention has increased throwing power along with other desirable characteristics such as solvent, corrosion and chip resistance.

SUMMARY OF THE INVENTION

An improved aqueous electrocoating composition having a binder of an epoxy-amine adduct and a blocked polyisocyanate crosslinking agent; wherein the improvement is the use of an effective amount of a blend of a zinc containing compound and lead pigment to provide an electrocoating composition having improved throwing power.

DETAILED DESCRIPTION OF THE INVENTION

The improved electrocoating composition of this invention preferably contains a blend of about 10–90% by weight of the zinc containing compound and correspondingly about 90–10% of the lead pigment. Preferably, the blend is used in a blend to binder weight ratio of about 0.001:1 to 0.1:1.

Typical zinc compounds that are used are zinc acetate, zinc borate and zinc hydroxyphosphite. Zinc hydroxyphosphite is preferred since it forms a composition that not only has improved throwing power but has good corrosion and chip resistance.

Zinc hydroxyphosphite pigment is commercially available under the trademark Nalzin ®2 from Rheox Inc.

Typical lead pigments that are used are lead silicate, lead cyanamide, lead chromate and lead silicochromate. Lead silicate is preferred.

It has also been found that by using the blend of the zinc containing compound, in particular zinc hydroxyphosphite and the lead pigment with a primary metal catalyst such as dibutyl tin oxide, dibutyl tin dilaurate or alkyl tin diacetyl acetonate, an electrocoating composition is formed that has excellent cure and chip resistance under overbake and underbake conditions which occur on a typical automobile or truck assembly line. In relation to the metal catalyst, the blend is used in a weight ratio of about 1.0:1.0 to 3.0:1.0.

Most principal emulsions used in an electrocoating composition which are the binder of the composition comprise an aqueous emulsion of an epoxy amine adduct blended with a cross-linking agent which has been neutralized with an acid to form a water soluble product. Generally, a metal catalyst is added to a blend of the epoxy amine adduct and crosslinking agent before water is added to form an emulsion. The catalyst is added in solution and mixed with the blend of epoxy amine adduct and crosslinking agent.

Useful epoxy amine adducts are generally disclosed in U.S. Pat. No. 4,419,467 which is incorporated herein by reference.

Preferred crosslinking agents are also well known in the prior art and are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are prereacted with a blocking agent such as oximes, alcohols, and caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder resin of the epoxy amine adduct and the blocked isocyanate are the principal resinous ingredients in the electrocoating composition and are usually present in amounts of about 40 to 60 percent by weight of epoxy amine adduct and 60 to 40 percent by weight of blocked isocyanate.

Besides the binder components described above, the electrocoating composition usually contains pigment which is incorporated into the composition in the form of a pigment paste. The pigment paste is prepared by grinding or dispersing a pigment into a grinding vehicle, and optional ingredients such as wetting agents, surfactants, and defoamers are added. Any of the pigment grinding vehicles that are well known in the art can be used. After grinding, the particle size of the pigment should be as small as practical, generally, the particle size is about 6–8 using a Hegman grinding gauge.

The zinc compound such as zinc hydroxyphosphite and the lead pigment are added to the pigment paste with other pigments which include titanium dioxide, carbon black, iron oxide, clay and the like. A separate pigment paste can be made of the zinc compound and/or the lead pigment. Pigments with high surface areas and oil absorbencies should be used judiciously because these can have an undesirable affect on coalescence and flow of the electrodeposited coating. It is possible to grind the zinc hydroxyphosphite pigment separately and add it to the paste or to the electrocoating bath directly.

The pigment to binder weight ratio of all the pigments used also is important and should be preferably less than 0.5:1, more preferably less than 0.4:1, and usually about 0.2 to 0.4:1. Higher pigment to binder weight ratios have also been found to adversely affect coalescence and flow.

The coating composition of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 2.0 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight binder solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentration of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

Besides water, the aqueous medium generally contains a coalescing solvent or solvents. Useful coalescing solvents include hydrocarbons, alcohols, polyols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0.1 to 15 percent by weight, preferably about 0.5 to 5 percent by weight based on total weight of the binder solids.

The following example illustrates the invention. All parts and percentages are on a weight basis unles otherwise indicated.

EXAMPLE

Preparation of Epoxy Amine Adduct

The following ingredients were charged into a suitable reaction vessel: 1478 parts Epon 828 ® (epoxy resin of diglycidyl ether of Bisphenol A from Shell Chemical Company having an epoxy equivalent weight of 188); 533 parts ethoxylated Bisphenol A having a hydroxy equivalent weight of 247 (Synfac 8009 ® from Milliken company); 421 parts of Bisphenol A; and 121 parts xylene. The resulting reaction mixture was heated to 160° C. under a nitrogen blanket and held at this temperature for 1 hour. 5.1 parts dimethyl benzyl amine were added and the mixture was held at 147° C. until a 1150 epoxy equivalent weight was obtained. The reaction mixture was cooled to 98° C. and 168 parts of diketimine (reaction product of diethylenetriamine and methyl isobutyl ketone at 72.7% solids) and 143 parts of methyl ethanol amine were added. The resulting mixture was held at 120° C. for 1 hour and then 727 parts of methyl isobutyl ketone were added. The resulting resin solution had a non-volatile content of 75%.

| Preparation of Quaterinizing Agent | Parts by Weight |
| --- | --- |
| Blocked Isocyanate Solution (2-Ethylhexanol half capped toluene diisocyanate in methyl isobutyl ketone) | 320.0 |
| Dimethylethanol amine | 87.2 |
| Aqueous lactic acid solution | 117.6 |
| 2-Butoxyethanol | 39.2 |
| Total | 564.0 |

The quaternizing agent was prepared by adding dimethylethanol amine to the blocked isocyanate solution in a suitable reaction vessel at ambient temperature. An exothermic reaction occurs and the reaction mixture was stirred for one hour and held at a temperature of 80° C. Lactic acid solution was added followed by the addition of 2-butoxyethanol. The reaction mixture was stirred for an additional hour at 65° C. to form the quaternizing agent.

| Preparation of Pigment Grinding Vehicle | Parts by Weight |
| --- | --- |
| "Epon 829" (epoxy resin of diglycidyl ether of Bisphenol A from Shell Chemical Company having an epoxy equivalent weight of 192-203) | 710.0 |
| Bisphenol A | 289.6 |
| Blocked isocyanate solution (described above) | 406.0 |
| Quaternizing Agent (prepared above) | 496.3 |
| Deionized water | 71.2 |
| 2-Butoxyethanol | 1095.2 |
| Total | 3068.3 |

Epon 829 ® and Bisphenol A were charged under a nitrogen atmosphere to a suitable reaction vessel and heated to 150°-160° C. to initiate an exothermic reaction. The reaction was allowed to continue for one hour. The reaction mixture was cooled to 120° C. and the blocked isocyanate solution was added. The temperature of the reaction mixture was held at 110°-120° C. for one hour, followed by the addition of 2-butoxyethanol. The reaction mixture then was cooled to 85°-90° C., homogenized and then the deionized water was added followed by the addition of the Quaternizing agent. The reaction mixture was held at about 80°-85° C. until an acid value of about 1 was obtained. The resulting mixture had a solids content of about 58%.

Preparation of Flex Emulsion Additive

A flex emulsion additive was prepared by charging 2322 parts by weight of Jeffamine ® D-2000 (a polyoxypropylene diamine having a molecular weight of about 1992 from Texaco Company) to a reaction vessel under a nitrogen atmosphere and heated to 90° C., followed by the addition of a solution of 859 parts by weight of "Epon 1001" (polyglycidyl ether of bisphenol A having an epoxy equivalent of 500 from Shell Chemical Company) in 345 parts by weight of 2-butoxyethanol. The resulting reaction mixture was dispersed by combining 68 parts by weight of acetic acid and 5354 parts of deionized water.

| Preparation of Emulsion | Parts by Weight |
|---|---|
| Epoxy amine adduct (prepared above) | 1110 |
| Crosslinking Resin Solution[1] | 624 |
| Downol PPH ® (from Dow Chemical Co.) | 13 |
| Surfactant[2] | 20 |
| Deionized water | 1884 |
| Lactic acid | 48 |
| Total | 3700 |

[1] Crosslinking resin solution is formed from the reaction product of PAPI 2027 (polymeric methylene diphenyl diisocyanate) with diethylene glycol monobutyl ether in a 1:1 equivalent ratio in methyl isobutyl ketone to form an 80% solids solution.
[2] Surfactant is a mixture of 120 parts Amine C from Ciba-Ceigy, 120 parts acetylenic alcohol, commercially available as Surfynol 1043, 120 parts of 2-butyoxy ethanol and 221 parts of deionized water and 19 parts glacial acetic acid.

The epoxy amine adduct was thoroughly mixed with the crosslinking resin solution, Downol PPH ®, lactic acid and the surfactant. Deionized water was added under agitation to form a dispersion. The resulting dispersion has a solids content of 36% and a pH of 6.8.

| Preparation of Pigment Pastes A, B & C | Parts by Weight | | |
|---|---|---|---|
| | A | B | C |
| Pigment Grinding Vehicle (prepared above) | 295 | 295 | 295 |
| Deionized water | 476 | 476 | 476 |
| Carbon black pigment | 25 | — | — |
| Aluminum silicate pigment | 57 | — | — |
| Lead silicate pigment | — | 428 | — |
| Dibutyl tin oxide | 18 | — | — |
| Titanium dioxide pigment | 328 | — | — |
| Zinc Hydroxyphosphite pigment | — | — | 428 |
| Total | 1199 | 1199 | 1199 |

For each pigment paste A, B, and C, the above constituents were charged into a conventional sand mill and ground to a No. 7 Hegman fineness.

| Preparation of Electrocoating Baths A-C | Parts by Weight | | |
|---|---|---|---|
| | A | B | C |
| Emulsion (prepared above) | 1159 | 1159 | 1159 |
| Flex Emulsion Additive (prepared above) | 131 | 131 | 131 |
| Pigment Paste A (prepared above) | 312 | 294 | 294 |
| Pigment Paste B (prepared above) | — | 18 | 9 |
| Pigment Paste C (prepared above) | — | — | 9 |
| Deionized Water | 1498 | 1498 | 1498 |
| Total | 3100 | 3100 | 3100 |

Electrocoating baths A-C were prepared by blending the above constituents together. Zinc phosphate coated cold-rolled steel panels were cathodically electrocoated in each bath at a bath temperature of 30° C. for 2 minutes at 150, 150 and 192 volts for baths A-C, respectively. A 0.95 mil thick film was deposited.

The throwing power of each bath was measured according to Ford Laboratory Test Method MJ BI 20-2C wherein the distance the coating deposits on the inside of a box formed by the panels of 18"×4" is measured. The throwing power of each of the baths was as follows:

| Bath | A | B | C |
|---|---|---|---|
| Throwing Power (inches) | 9¼ | 9¼ | 10¼ |

The above data shows that Bath C, which contains the combination of zinc hydroxyphosphite pigment and lead silicate pigment has significantly improved throwing power in comparison to Bath A, which did not contain either pigment and Bath B, which only contained the lead silicate pigment.

Each of the above panels coated in Baths A-C were baked at about 182° C. for 17 minutes and had acceptable solvent and corrosion resistance. Another set of panels was prepared as above and baked and topcoated with an acrylic enamel and the enamel was cured at 130° C. for 17 minutes. Each of these panels had acceptable chip resistance as determined by a gravelometer test.

We claim:

1. In a cathodic electrocoating composition, comprising an aqueous carrier having dispersed therein a film forming binder comprising an epoxy-amine adduct and a blocked polyisocyanate crosslinking agent; wherein an improvement comprises the use of a blend consisting essentially of about 10-90% by weight, based on the weight of the blend, of zinc hydroxyphosphite and correspondingly, 90-10% by weight, based on the weight of the blend, of lead pigment in a blend to binder weight ratio of about 0.001:1 to 0.1:1 to provide an electrocoating composition having improved throwing power.

2. The cathodic electrocoating composition of claim 1 in which the lead pigment is from the group lead silicate, lead cyanamide, lead chromate and lead silicochromate.

3. The cathodic electrocoating composition of claim 1 containing a primary metal catalyst.

4. The cathodic electrocoating composition of claim 3 wherein the blend consists of about 50% by weight of zinc hydroxyphosphite pigment and about 50% by weight of lead silicate pigment and is used in a pigment to binder weight ratio of about 0.001:1 to 0.1:1 and the primary metal catalyst is dibutyl tin dilaurate, dibutyl tin oxide, alkyl tin diacetyl acetonate, or mixtures thereof.

5. In an improved method for preparing a cathodic electrocoating composition containing film forming binder comprising the following steps in any workable order:
 (a) preparing an epoxy-amine adduct;
 (b) preparing a blocked polyisocyanate crosslinking agent;
 (c) blending the epoxy amine adduct with the blocked polyisocyanate crosslinking agent;
 (d) neutralizing the epoxy-amine adduct with an organic acid to form an emulsion;
 (e) blending the emulsion with a pigment paste; and
wherein the improvement comprises the use of a blend consisting essentially of about 10-90% by weight, based on the weight of the blend, of zinc hydroxyphosphite and correspondingly, 90-10% by weight, based on the weight of the blend, of lead pigment in a blend to binder weight ratio of about 0.001:1 to 0.1:1. to provide an electrocoating composition having improved throwing power.

6. The method of claim 5 in which the lead pigment is from the group lead silicate, lead cyanamide, lead chromate and lead silicochromate.

7. The method of claim 5 in which the cathodic electrocoating composition of claim 1 contains a primary metal catalyst.

8. The method of claim 5 wherein the blend consists of about 50% by weight of zinc hydroxyphosphite pigment and about 50% by weight of lead silicate pigment and is used in a pigment to binder weight ratio of about 0.001:1 to 0.1:1 and the primary metal catalyst is dibutyl tin dilaurate, dibutyl tin oxide, alkyl tin diacetyl acetonate, or mixtures thereof.

* * * * *